Patented July 25, 1939

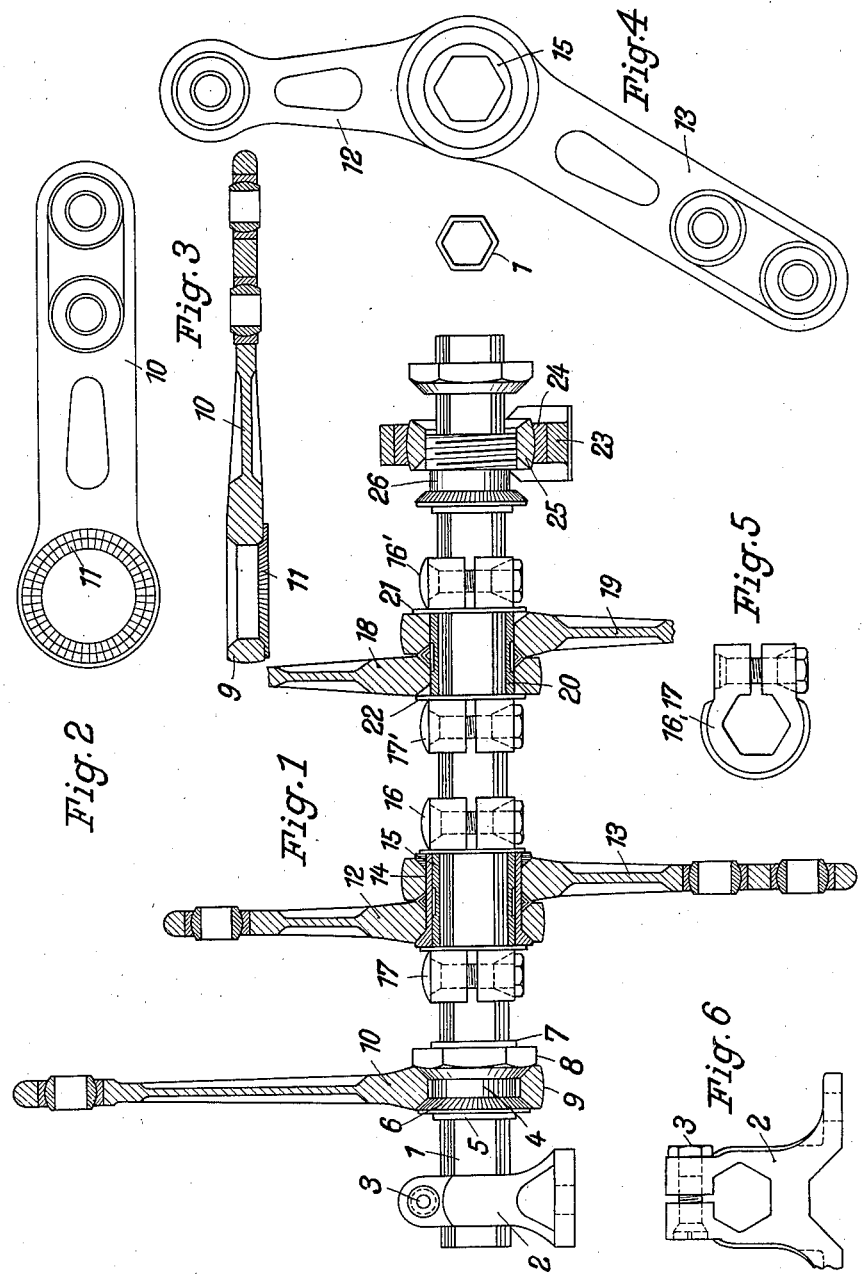

2,167,230

UNITED STATES PATENT OFFICE 2,167,230

CONTROL MECHANISM

Rifat Avigdor, Berlin, Germany

Application March 25, 1937, Serial No. 132,997
In Germany May 25, 1936

2 Claims. (Cl. 74—522)

Control mechanism for the mechanical utilisation and transmission of controlling movements for the actuation of control members, carburetters, valves, electric switches and similar devices on stationary installations, and particularly on aircraft, are known in which hollow shafts are used and provided with external teeth or splines, control levers being displaceably mounted on the shafts. The bosses of such control levers are provided with internal teeth or splines. This construction has, inter alia, the disadvantage that it neither permits the lever to be turnable as desired about the shaft, nor a floating arrangement of the lever on the free end of the shaft. Apart from this, the production of the teeth or splines is comparatively expensive and the parts in engagement always have a certain amount of play, representing a lost motion of the control mechanism, which is detrimental to exactness in operation.

According to the present invention, it is proposed to construct the control mechanism in such a manner that the external suface of the hollow shaft consists of a prism, preferably a hexagonal prism, around which bearings, levers and fixing and securing means are arranged to be displaced relatively to the shaft, or to be fixed or turnable, as desired, relatively to one another, or to be displaced axially.

According to the invention the fixing devices for levers and bearings may be constructed as sleeves adapted to be pushed on to the shaft and provided at one end with a locking ring and at the other end with a screw thread and nut. The rims of the bosses or edges of the levers are formed with conically disposed or frontal teeth or splines or with both conically disposed and frontal teeth.

As means for securing the individual parts against axial displacement on the shaft or with respect to one another, there can be used known fixing or locking rings with tension screws and nuts or the fixing sleeves in the assembly can be used and provided with locking rings, screw threads and nuts, with co-operating longitudinal slots permitting simultaneously a locking effect around the shaft.

In this way, the most varied arrangements of the constructional parts relatively to the shaft or to one another are possible, of which parts, owing to their particular construction, only a limited number of types are necessary. The various arrangements do not necessitate any alteration to the parts or to the shaft, for they are merely brought about by screwing and locking actions. Moreover, the parts are also easily separated from one another and can be employed in another position relatively to the shaft or to one another. This is important especially in the testing of experimental aircraft, as the present troublesome time and material-wasting work of interchanging parts is dispensed with. Since similar parts are always to be employed for different control mechanism, the structures can be produced more cheaply in large quantities as separate parts, whereby the obtaining of spare parts and the business of keeping them is considerably facilitated and cheapened.

The construction of the parts, which allow an extensive application, avoids lost motion of the parts, and also takes into account forces such as occur due to temperature variation and distortion of the control mechanism caused by faulty mounting or alterations of the plane or surface upon which the shaft bearings are arranged. Longitudinal displacements of the parts are taken into account as well as torsions or twisting, since these occur with aircraft during squalls.

Consequently, the shaft bearings and the eye bearings provided at the ends of the levers for coupling the latter with rods are constructed not, as is usual, as slide and ball bearings, but as the known slide and swivel bearings, since these, in addition to axial displacement, also allow a certain oscillation or swinging of the shaft or pin parts mounted therein. In this way, any hindrance of the mobility of the shafts, levers and rods of the control mechanism is extensively guarded against. Consequently, a control mechanism is obtained which is readily assembled, is capable of being easily converted on account of its separate parts being adapted to be used repeatedly and which completely obviates lost motion but, nevertheless, is produced cheaply. Moreover, the exactitude of the control setting is assured more quickly and with greater certainty than hitherto and, on account of its mobility, a simple and finely adjusted operation is possible, which is very important, especially on aircraft.

One construction of a device according to the present invention is shown, by way of example, on the accompanying drawing whereon:

Fig. 1 shows, partly in section and partly in elevation, various constructional parts grouped together in a control mechanism, the known rod being omitted;

Fig. 2 shows a lever in elevation;

Fig. 3 shows a lever in longitudinal section;

Fig. 4 shows a bell-crank lever in elevation;

Fig. 5 shows a locking ring; and

Fig. 6 shows a bracket, both in side elevation. Referring to the drawing:

On the equilateral hexagonal hollow shaft 1 shown in Fig. 1 there is arranged a bracket 2, which has a corresponding hexagonal opening and can be fastened by means of a screw 3, see Fig. 6. Moreover, there is also arranged on the shaft 1 a clamping sleeve 4 which, at one end, has a ring 5 provided with teeth or splines 6, a screw-thread 7 being formed at the other end of the sleeve and provided with a nut 8. Between the ring 5 and the nut 8 the boss 9 of a lever 10 is clamped, the latter being unable to turn relatively to the shaft since the teeth or splines 11 on the lever 10, see Fig. 2, engage exactly with the teeth or splines 6 on the clamping sleeve 4. Moreover, since the lever 10 is disposed on the clamping sleeve, it is displaceable axially with the latter along the shaft 1. By means of a suitable longitudinal slitting of the sleeve (which is not illustrated but can easily be imagined) the sleeve, together with the lever, can be mounted on the shaft under the action of the clamping ring 5 and nut 8.

A composite cranked lever, which is constituted by two levers 12 and 13, is arranged next to the lever 10 on the shaft 1. The two levers engage with one another on their inner faces by means of their splines or teeth and they are held against displacement relatively to one another by a sleeve 14 turnably mounted on a sliding bush 15, which has a hexagonal opening and is pushed on to the shaft 1. The composite cranked lever is retained in position on the shaft by means of clamping rings 16 and 17.

The device shown to the right of the lever 12—13 consists of a cranked lever 18—19, the angle of which can be varied. The two levers 18 and 19 are held together in the form of a cranked lever by the interengagement of their toothed edges by clamping rings 16¹ and 17¹. The sleeve 20 has an internal hexagonal opening whilst it is circular on its outer surface so that the levers can turn on it. Intermediate discs 21 and 22 prevent binding.

The oscillatable or swivelling bearing 23 has a member 24 formed with a partly spherical bore in which a ring 25 having a partly spherical outer surface can turn. The ring is supported on the shaft by means of a clamping sleeve 26, which is similar to the clamping sleeve 4 and is axially displaceable on the shaft. On account of the partly ball-like shape of the ring 25 no binding can take place upon the displacement of the shaft. On the other hand, the somewhat axially displaceable shaft can slide through the sleeve 26. The parts of the bearing are shown in position before assembly. The lever eyes at the ends of the levers are fitted with similar partly-spherical or swivelling bearings.

The toothed part 11 actually comprises sixty teeth, so that the position of the levers etc., relatively to one another or to the shaft can be varied by 6° and, as shown in Fig. 3, the teeth extend perpendicularly to the axis of the shaft at their outer ends and then at 45° to the axis.

What I claim is:

1. A control assembly comprising, in combination, a shaft having a polygonal outer surface, a bushing displaceable on said shaft having an inner polygonal surface engaging that of said shaft and further having a cylindrical outer surface, a sleeve embracing said bushing and turnable thereon, a control element encircling said sleeve, said element and sleeve having interengaging teeth formed thereon so that said parts will turn in unison about said shaft, and means cooperating with said sleeve for maintaining said teeth in interengaged relation.

2. A control assembly comprising, in combination, a shaft having a polygonal outer surface, a bushing displaceable on said shaft having an inner polygonal surface engaging that of said shaft and further having a cylindrical outer surface, a sleeve embracing said bushing and turnable thereon, two control elements encircling said sleeve, there being cooperating interengaging means therebetween for turning said elements and sleeve about said bushing, and means on said shaft to maintain said interengaging means in cooperative relation.

RIFAT AVIGDOR.